(12) United States Patent
Bradley et al.

(10) Patent No.: US 9,850,927 B2
(45) Date of Patent: Dec. 26, 2017

(54) FASTENER INSTALLATION IN COMPOSITE PANELS WITH FASTENER INSERT

(71) Applicant: The Boeing Company, Chicago, IL (US)

(72) Inventors: James S. Bradley, Arlington, WA (US); Michael S. Lewis, Lake Forest Park, WA (US); Brad J. Reeves, Everett, WA (US)

(73) Assignee: The Boeing Company, Chicago, IL (US)

( * ) Notice: Subject to any disclaimer, the term of this patent is extended or adjusted under 35 U.S.C. 154(b) by 94 days.

(21) Appl. No.: 14/817,980

(22) Filed: Aug. 4, 2015

(65) Prior Publication Data

US 2017/0037886 A1    Feb. 9, 2017

(51) Int. Cl.
*F16B 5/01*    (2006.01)
*F16B 39/284*    (2006.01)
(Continued)

(52) U.S. Cl.
CPC .............. *F16B 5/01* (2013.01); *B23P 19/002* (2013.01); *B60R 13/0206* (2013.01);
(Continued)

(58) Field of Classification Search
CPC ...... F16B 5/01; F16B 37/043; F16B 19/1081; F16B 21/086; F16B 13/0833; F16B 13/124; F16B 5/0258; F16B 39/32; F16B 39/284; F16B 39/34; F16B 13/141; F16B 13/0808; Y10S 411/908; Y10S 411/97; Y10S 411/913; Y10T 19/49938; Y10T 403/4949; Y10T 403/557; Y10T 403/7061; B60R 13/0206
(Continued)

(56) References Cited

U.S. PATENT DOCUMENTS 2,784,759 A * 3/1957 Modrey ................ F16B 37/044
                                                         411/108
2,793,351 A * 5/1957 Heath ................ H01R 33/7657
                                                         439/546
(Continued)

OTHER PUBLICATIONS

Reeves, et al., U.S. Appl. No. 14/543,147, entitled "Panel-Insert Assembly and Method," filed Nov. 17, 2014.
(Continued)

*Primary Examiner* — Joshua J Michener
*Assistant Examiner* — Matthew J Gitlin
(74) *Attorney, Agent, or Firm* — Miller, Matthias & Hull LLP (57) ABSTRACT

Systems and methods provide for the installation of fasteners in a composite panel with a fastener insert. A fastener insert for a composite panel includes a body and a at least three arms extending from the body. The body has a top face and a central hub extending rearward from the top face. The top face has an outer dimension between opposing edges. The arms extend from the central hub on a rear side of the body. In a retracted configuration, the arms are folded inward toward the central hub so that the arms do not extend beyond the outer dimension of the top face. In an extended configuration, the arms extend outward from the central hub beyond the outer dimension of the top face.

15 Claims, 6 Drawing Sheets

(51) Int. Cl.
*B23P 19/00* (2006.01)
*B60R 13/02* (2006.01)
*F16B 19/10* (2006.01)
*F16B 37/04* (2006.01)
*F16B 13/14* (2006.01)
*F16B 13/08* (2006.01)

(52) U.S. Cl.
CPC ........ *F16B 13/0808* (2013.01); *F16B 13/141* (2013.01); *F16B 19/1081* (2013.01); *F16B 37/043* (2013.01); *F16B 39/284* (2013.01)

(58) Field of Classification Search
USPC .................. 403/277; 411/508, 509, 510, 252
See application file for complete search history.

(56) References Cited

U.S. PATENT DOCUMENTS

| | | | | |
|---|---|---|---|---|
| 3,177,540 A * | 4/1965 | Hall | ...................... | F16B 21/086 24/453 |
| 3,213,746 A * | 10/1965 | Dwyer | ................... | F16B 13/06 411/15 |
| 3,455,201 A * | 7/1969 | Ryder | ................... | F16B 21/075 411/15 |
| 3,579,942 A * | 5/1971 | Cole | ......................... | F16B 5/01 411/113 |
| 3,651,734 A * | 3/1972 | McSherry | ............ | F16B 5/0642 411/15 |
| 3,701,302 A * | 10/1972 | Pestka | ................... | F16B 21/02 411/15 |
| 4,274,324 A * | 6/1981 | Giannuzzi | ............ | F16B 13/061 411/15 |
| 4,286,496 A * | 9/1981 | Harris | ...................... | B25C 1/18 102/532 |
| 4,294,570 A * | 10/1981 | Meschnig | ............... | F16B 21/10 411/103 |
| 4,300,865 A * | 11/1981 | Murray | ................. | F16B 37/043 411/15 |
| 4,428,705 A * | 1/1984 | Gelhard | ............... | F16B 37/122 29/460 |
| 4,457,653 A * | 7/1984 | Leib | ................... | F16B 13/0808 411/342 |
| 4,520,601 A * | 6/1985 | Stacey, Jr. | ............... | B64G 1/58 244/159.1 |
| 4,636,121 A * | 1/1987 | Miller | ..................... | F16B 39/04 411/140 |
| 4,834,600 A * | 5/1989 | Lemke | ................. | E04D 3/3603 411/182 |
| 4,883,382 A * | 11/1989 | Mushya | ............... | F16B 5/0233 174/138 D |
| 4,978,265 A | 12/1990 | De Wan | | |
| 5,007,779 A * | 4/1991 | Goran | ....................... | F16B 5/01 411/41 |
| 5,094,563 A * | 3/1992 | Carletti | ..................... | F16B 5/01 16/2.1 |
| 5,106,225 A * | 4/1992 | Andre | ................... | F16B 5/0233 403/297 |
| 5,205,688 A * | 4/1993 | Sundstrom | ............ | F16B 13/061 411/34 |
| 5,226,768 A * | 7/1993 | Speer | .................... | F16B 13/045 411/21 |
| 5,236,293 A * | 8/1993 | McSherry | ........... | F16B 13/0808 29/525.02 |
| 5,308,204 A * | 5/1994 | Moen | .................... | F16B 13/061 29/522.1 |
| 5,375,954 A * | 12/1994 | Eguchi | ................ | F16B 19/1081 411/41 |
| 5,454,479 A * | 10/1995 | Kraus | .................... | F16B 21/088 215/355 |
| 5,643,266 A * | 7/1997 | Li | ........................ | A61F 2/0811 606/65 |
| 5,658,110 A * | 8/1997 | Kraus | .................... | B62D 25/24 411/508 |
| 5,673,887 A * | 10/1997 | Hollingsworth | ...... | A47F 5/0823 248/220.31 |
| 5,702,215 A * | 12/1997 | Li | ....................... | F16B 13/0866 411/21 |
| 6,146,406 A * | 11/2000 | Shluzas | .............. | A61B 17/0401 606/232 |
| 6,305,055 B1 * | 10/2001 | Castro | .................... | F16B 21/086 24/458 |
| 6,565,303 B1 * | 5/2003 | Riccitelli | .............. | E04D 3/3603 411/368 |
| 6,979,163 B2 * | 12/2005 | Brletich | ................ | F16B 21/084 411/418 |
| 7,073,997 B2 * | 7/2006 | Kovac | ................... | F16B 5/0258 411/353 |
| 7,559,717 B2 * | 7/2009 | Salas | ........................ | E03B 9/10 220/787 |
| 7,641,427 B2 * | 1/2010 | Zhang | ...................... | F16B 5/01 411/21 |
| 7,967,539 B2 * | 6/2011 | Huet | ........................ | F16B 5/065 411/508 |
| 8,020,278 B2 * | 9/2011 | Kovac | ................... | F16B 5/0258 29/525.01 |
| 8,075,234 B2 * | 12/2011 | McClure | ............. | F16B 19/1081 411/55 |
| 8,136,328 B2 | 3/2012 | Erickson et al. | | |
| 8,393,058 B2 * | 3/2013 | Okada | ................. | B60R 13/0206 24/297 |
| 8,753,053 B2 * | 6/2014 | Clinch | .................... | F16B 5/01 156/73.1 |
| 8,979,460 B2 * | 3/2015 | Ostergren | ............ | F16B 21/084 24/453 |
| D760,332 S * | 6/2016 | Black, Jr. | ........... | A63B 69/3623 D21/717 |
| 2008/0116094 A1 | 5/2008 | Truong et al. | | |
| 2014/0284335 A1 | 9/2014 | Truong et al. | | |
| 2015/0016871 A1 * | 1/2015 | Sugimoto | ................ | F16B 5/08 403/271 |
| 2015/0135484 A1 * | 5/2015 | Leverger | ............... | F16B 21/086 24/292 |

OTHER PUBLICATIONS

Lewis, et al., U.S. Appl. No. 14/445,242, entitled, "Panel-Insert Assembly and Method," filed Jul. 29, 2014.

* cited by examiner

FASTENER INSTALLATION IN COMPOSITE PANELS WITH FASTENER INSERT

BACKGROUND

Composite panels, such as a composite sandwich panel, may consist of a front sheet, a rear sheet, and a core material (i.e., honeycomb or foam) between the front and rear sheets. To attach components to a composite panel, fasteners are commonly used. The fasteners must be attached to fastener inserts that are installed within the composite panel and are used to secure the fastener and corresponding component to the panel, while spreading the corresponding load to the panel. The installation of fastener inserts into composite panels is a cumbersome, labor-intensive process. Using conventional techniques, holes are drilled into the composite panel and fastener inserts are positioned within the holes. Potting compound may be injected into the fastener insert until it exits a separate port to indicate that the proper amount of potting compound has been utilized. However, due to the positioning of the holes, multiple honeycomb cells may be exposed, requiring differing amounts of potting compound. As many fastener inserts may be required in a composite panel for a common aircraft application, the entire process is time consuming and costly.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for the installation of fasteners in a composite panel with a fastener insert. According to one aspect, a fastener insert for a composite panel includes a body and a number of arms extending from the body. The body of the fastener insert has a top face and a central hub extending rearward from a central portion of the top face. The top face has an outer dimension between opposing edges. The central hub includes a receiving mechanism for receiving a fastener through the top face of the body. The arms extend from the central hub on a rear side of the body. In a retracted configuration, the arms are folded inward toward the central hub so that the arms do not extend beyond the outer dimension of the top face. In an extended configuration, the arms extend outward from the central hub beyond the outer dimension of the top face.

According to another aspect, a method for installing a fastener within a composite panel is provided. According to the method, a number of arms of a fastener insert are folded inward around an axis extending from a front to rear through a central hub of the fastener insert while installing the fastener insert into an aperture in the composite panel. The fastener insert is positioned within the aperture until the top face of the fastener insert is flush with a top sheet of the composite panel. The arms are extended from a retracted configuration in which the arms do not extend beyond an outer dimension of the top face to an extended configuration in which the arms are extended outward from the central hub beyond the outer dimension of the top face. The fastener is installed through the top face of the fastener insert and into the central hub of the fastener insert.

According to yet another aspect, a fastener insert system for a composite panel is provided. The fastener insert system includes a fastener insert and an installation tool. The fastener insert includes a body and a number of arms extending from the body. The body of the fastener insert has a top face and a central hub extending rearward from a central portion of the top face. The top face has an outer dimension between opposing edges. The central hub includes a receiving mechanism for receiving a fastener through the top face of the body. The arms extend from the central hub on a rear side of the body. In a retracted configuration, the arms are folded inward toward the central hub so that the arms do not extend beyond the outer dimension of the top face. In an extended configuration, the arms extend outward from the central hub beyond the outer dimension of the top face. The installation tool includes an upper portion having a converging diameter and a lower portion having a diameter that is complimentary to a diameter of the top face of the fastener insert. The lower portion of the installation tool guides the fastener insert into a fastener insert aperture of the composite panel while maintaining the arms in the retracted configuration.

The features, functions, and advantages that have been discussed can be achieved independently in various embodiments of the present disclosure or may be combined in yet other embodiments, further details of which can be seen with reference to the following description and drawings.

DETAILED DESCRIPTION

The following detailed description is directed to a fastener insert and corresponding system and method for installing a fastener within a composite panel, such as a composite sandwich panel. As discussed above, installing fastener inserts using traditional methods is a cumbersome and labor-intensive process, requiring manual drilling, insert installation, and potting compound injection. If the incorrect amount of potting compound is used, the integrity of the fastener insert may be compromised.

Utilizing the concepts and technologies described herein, a fastener insert includes a top face that installs flush with a top sheet of the composite panel. A central hub extends rearward from the top face, abutting a bottom sheet of the composite panel with adhesive placed between the central hub and the bottom sheet. A number of arms, typically three to six, although not limited to any particular number, extend from the central hub. These arms are configured to fold inward toward the hub for installation. Upon insertion between the top and bottom sheets of a composite panel, the arms extend outward beyond the outer dimensions of the top face of the fastener insert to abut a bottom surface of the top sheet of the composite panel to further secure the fastener insert within the panel. An installation tool facilitates the installation, allowing for automated rather than manual installation. The fastener insert and corresponding installation process ultimately saves time and money while providing secure fastener inserts in composite panels into which fasteners may be threaded or otherwise attached.

In the following detailed description, references are made to the accompanying drawings that form a part hereof, and which are shown by way of illustration, specific embodiments, or examples. Referring now to the drawings, in which like numerals represent like elements through the several figures, a fastener insert, system, and method for employing the same according to the various embodiments will be described.

Figure 1A:
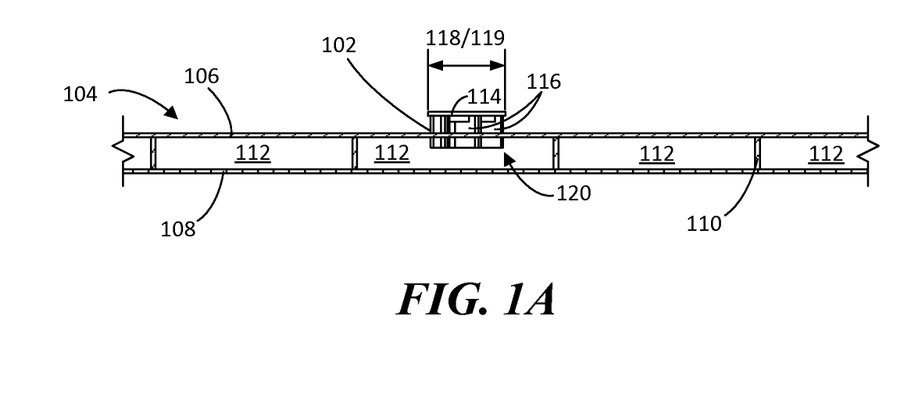
FIG. 1A is a side view of a fastener insert in a retracted configuration being installed in a composite panel according to various embodiments described herein.

FIG. 1A shows a side view of a fastener insert 102 in a retracted configuration 120 being installed in a composite panel 104. Looking at FIG. 1A, an example of a composite panel 104 is shown. According to this example, the composite panel 104 includes a top sheet 106 and a bottom sheet 108, separated by a core 110. The core 110 defines a number of cells 112. The core 110 may include a honeycomb composition, foam, air, or any other suitable core material. The top sheet 106 and bottom sheet 108 may be made from any desired material.

The fastener insert 102 includes a top face 114 and a number of arms 116 under the top face 104. The various features of a fastener insert 102 will be described in detail below with respect to FIGS. 2A-4. The fastener insert 102 is shown in a retracted configuration 120 in FIG. 1A in which the arms 116 are folded inward for installation. In the refracted configuration 120, the outer arms dimension 119 is substantially equal to or less than the top face outer dimension 118. In doing so, the fastener insert 102 may be inserted into an aperture within the composite panel 104 that is sized according to the top face outer dimension 118 so that the fastener insert 102 fits flush with the top sheet 106 of the composite panel 104.

The fastener insert 102 shown here and throughout the various drawings has a top face 114 that is circular in shape so that the top face outer dimension 118 is the diameter of the circle. Similarly, the arms 116 extend outwards so that the tips of the arms 116 create an outer arms dimension 119 that is a diameter of a circle. It should be appreciated, however, that the shape of the top face 114 and corresponding arms 116 of the fastener insert 102 may be configured according to any desired shape. The shape of the top face 114 should correspond with the aperture in the top sheet 106 of the composite panel 104 so that the fastener insert 102 fits snugly within the composite panel 104. The arms 116, regardless of the shape of the arms 116 or of the top face 114, should extend out farther than the top face 114 when configured in the extended configuration 122, as described below.

Figure 1B:
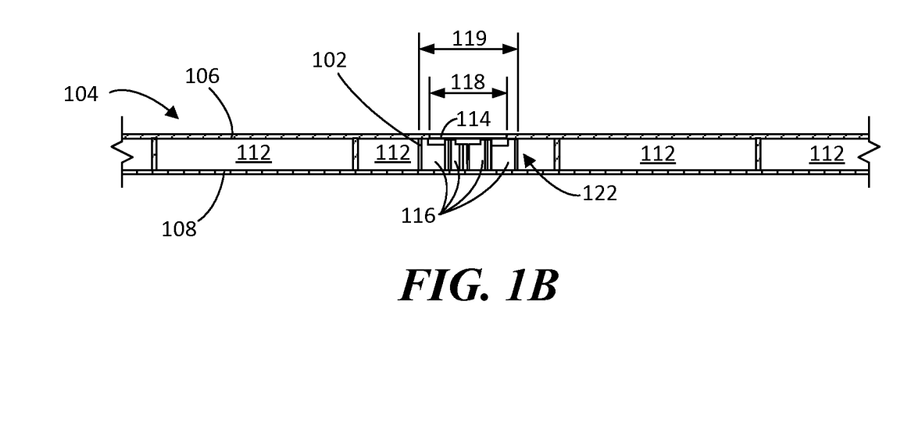
FIG. 1B is a side view of a fastener insert in an extended configuration installed in a composite panel according to various embodiments described herein.

FIG. 1B shows the fastener insert 102 installed within the composite panel 104 such that the arms 116 are extended in the extended configuration 122. Each arm 116 has a top sheet contact surface 302 (best seen in FIG. 3A) that engages a bottom surface of the top sheet 106 when the arms 116 are positioned in the extended configuration 122. This engagement prevents the fastener insert 102 from exiting the aperture once installed. Adhesive placed between the fastener insert 102 and the bottom sheet 108 of the composite panel 104 secure the fastener insert 102 in place. FIG. 1B illustrates the concept that the outer arms dimension 119 of the arms in the extended configuration 122 is greater than the top face outer dimension 118.

Figure 2A:
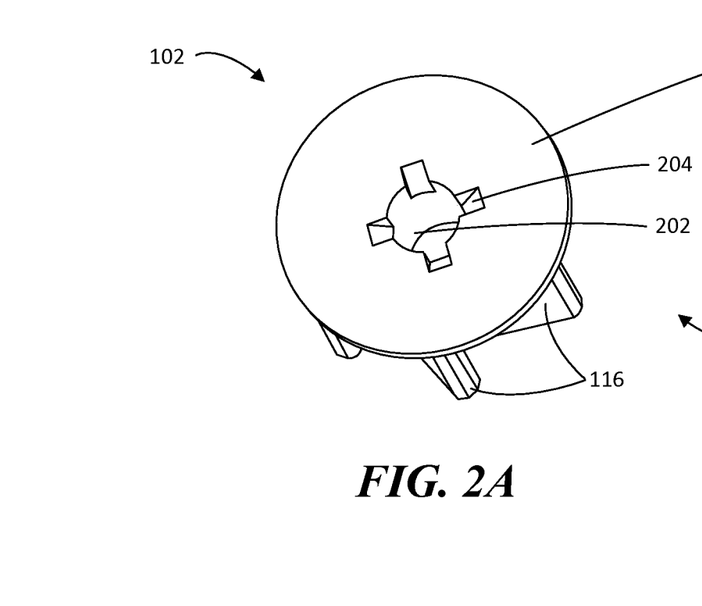
FIG. 2A is a front perspective view of a fastener insert in a retracted configuration according to various embodiments described herein.
Figure 2B:
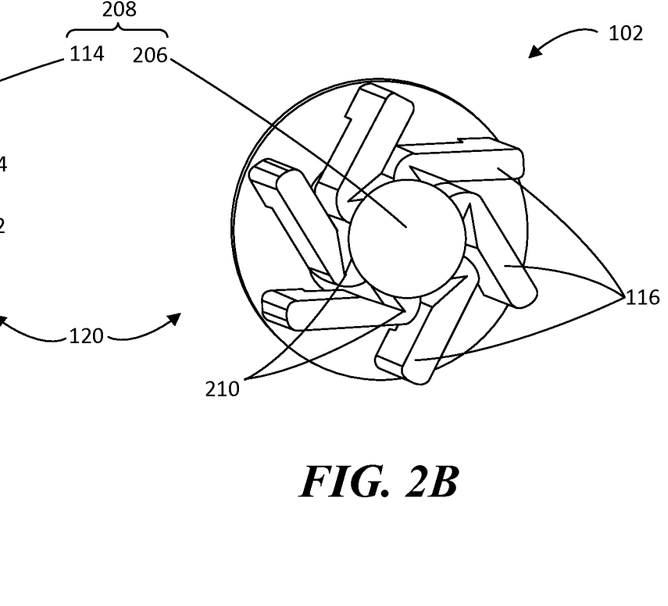
FIG. 2B is a rear perspective view of a fastener insert in a retracted configuration according to various embodiments described herein.

Turning to FIGS. 2A and 2B, front and rear perspective views, respectively, will be used to describe features of a fastener insert 102 having arms 116 in the retracted configuration 120. The fastener insert 102 includes a body 208 and the arms 116. The body 208 includes the top face 114 and a central hub 206. The central hub 206 extends rearward from a central portion of the top face 114. According to this embodiment, the central hub 206 is cylindrical, although the central hub 206 is not limited to any particular shape. The central hub 206 provides a receiving mechanism 202 configured to receive a fastener when installed within the composite panel 104. The receiving mechanism 202 may be a threaded recess configured to engage complimentary threads of the fastener. According to an alternative embodiment, the recess is not threaded, but due to the material of the fastener insert 102, deforms to engage threads of the fastener screwed into the fastener insert 102.

As seen in FIG. 2A, the receiving mechanism 202 may additionally include a tool engagement mechanism 204 configured to engage a tool for installation. In this example, the tool engagement mechanism 204 includes notches around the opening of the recess that are sized and shaped for engagement with a Phillips head screwdriver or similar engagement head of an installation tool such as a robotic installation apparatus. It should be appreciated that the tool engagement mechanism 204 may be any shape and size, or may not be necessary depending on the installation technique. The Phillips head arrangement allows for rotation during installation, as will be described in greater detail below with respect to FIG. 6, but in applications in which the fastener insert 102 is pressed downward into the composite panel 104 without rotation, the fastener insert 102 may not include a tool engagement mechanism 204.

As seen in FIGS. 2A and 2B, the arms 116 are folded inward toward the central hub 206 to create the retracted configuration 120. In the retracted configuration 120, the arms 116 do not extend beyond the outer edges of the top face 114 so that the fastener insert 102 may be inserted into the aperture in the composite panel 104. To facilitate the inward folding of the arms 116 toward the central hub 206, the arms each have a retraction mechanism 210. As will be described in greater detail below, the retraction mechanism may include a notch cut or formed into one side of the arm at the desired pivot point, or a hinge. Yet another alternative includes utilizing a material within the arms 116 that facilitates deformation at the desired pivot point without providing a notch or hinge.

Figure 3A:
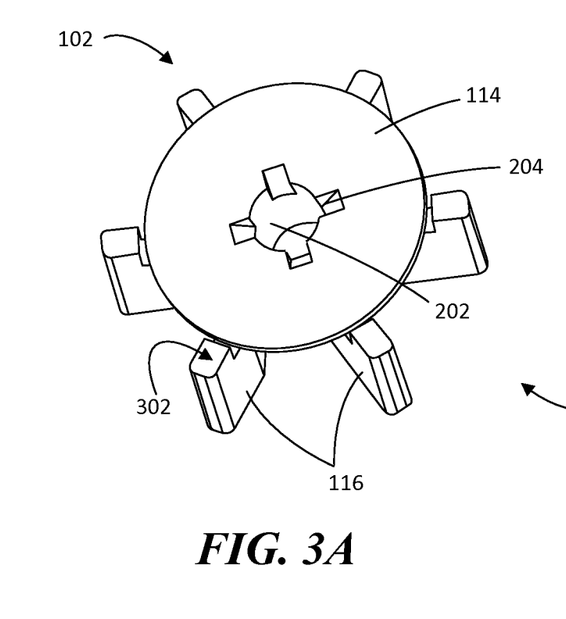
FIG. 3A is a front perspective view of a fastener insert in an extended configuration according to various embodiments described herein.
Figure 3B:
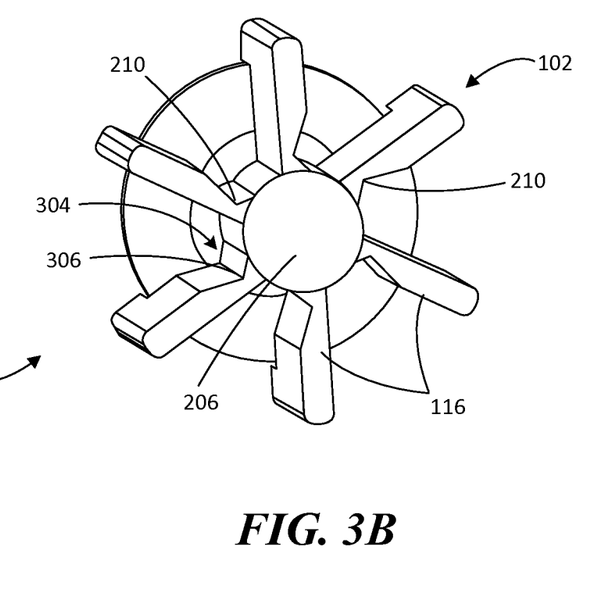
FIG. 3B is a rear perspective view of a fastener insert in an extended configuration according to various embodiments described herein.

FIGS. 3A and 3B show front and rear perspective views, respectively, of a fastener insert 102 configured with the arms 116 in the extended configuration 122. In the extended configuration 122, the arms 116 extend outward beyond the bounds of the top face 114. The arms 116 each have a top sheet contact surface 302 that abuts or is proximate to a bottom surface of the top sheet 106 of the composite panel 104 when the fastener insert 102 is installed within the composite panel 104. When the arms 116 are folded inward to the refracted configuration 120, the top sheet contact surfaces 302 abut or are proximate to a bottom surface of the top face 114 of the fastener insert 102.

FIG. 3B shows a rear perspective view of a fastener insert 102, which clearly illustrates one embodiment of the retraction mechanism 210 that allows the arms to transition between retracted and extended configurations. According to this embodiment, the retraction mechanism 210 includes a notch 304 that creates a pivot point 306 at the desired location. The notch 304 creates an area of the arm 116 that is weaker than the rest of the arm, allowing the arm 116 to deform around the notch 304 in response to a force applied to the tip and fold inwards toward the central hub 206.

According to various embodiments, the fastener insert 102 is biased in the extended configuration 122. In doing so, the arms 116 may be folded inward to the retracted configuration 120 during installation. When pressure is released from the arms 116 after the fastener insert 102 enters the aperture in the composite panel 104, the arms 116 will spring outward, returning to the extended configuration 122 in order to secure the fastener insert 102 in the composite panel 104. In the embodiment shown in FIG. 3B in which the retraction mechanism is a notch 304, the arms 116 may be created in the extended configuration 122, which then biases the arms 116 in that configuration. Applying a force against the tips or outer portions of the arms 116 deforms the arms 116 around the pivot points 306 of the notches 304, but the tension in the material of the arms 116 created by the deformation acts to return the arms 116 to the extended configuration 122 when the external force is released or removed.

Figure 4:
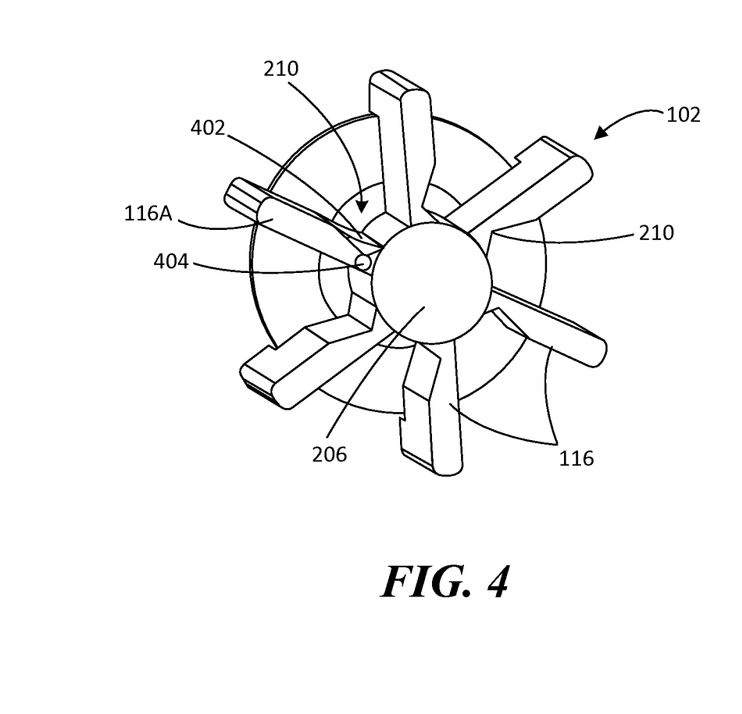
FIG. 4 is a rear perspective view of a fastener insert in an extended configuration showing alternative retraction mechanisms according to various embodiments described herein.

Turning now to FIG. 4, an alternative embodiment of the retraction mechanism 210 will be described. According to this embodiment, the retraction mechanism 210 of arm 116A includes a resilient member 402 attached to the arm 116A and a hinge 404 positioned at the desired pivot point. The resilient member 402 is configured to bend or deform in response to force applied to the outer portion of the arm 116A, allowing the arm 116A to rotate inward around the hinge 404. Upon removal of the force, the resilient member 402 returns the arm 116A to the starting location in the extended configuration 122. According to one embodiment, the resilient member 402 may be a spring, although any resilient material or spring-like mechanism capable of deformation with a desired amount of force and subsequent extension upon removal of the force may be used without departing from the scope of this disclosure. The hinge 404 is optional as the material of the arm 116A at the desired pivot point may be thin enough to act as a hinge with the resilient member 402 being operative to return the arm 116A to the extended position. Although only one arm, arm 116A, is shown in FIG. 4 to include a resilient member 402 and hinge 404, it should be appreciated that all or any number and combination of arms 116 may include any type of retraction mechanisms 210 such that the retraction mechanisms 210 are identical throughout the arms 116, or differ between arms 116.

The fastener inserts 102 shown throughout the drawings are shown with six arms 116. It should be appreciated that any number of arms 116 may be used without departing from the scope of this disclosure. It may be beneficial to utilize at least three arms 116 spaced evenly around the central hub 206 in order to increase the contact points with the top sheet 106 of the composite panel 104 to more securely couple the fastener insert 102 within the composite panel 104. An increased number of arms (i.e., greater than two) additionally aids in the distribution of the loads encountered by the fastener insert 102 to a larger portion of the composite panel 104, preventing damage to the panel.

Figure 5:
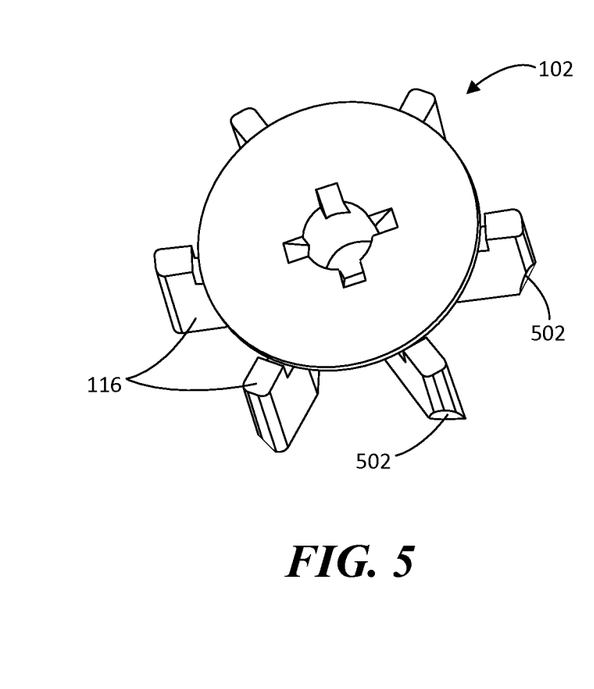
FIG. 5 is a front perspective view of a fastener insert having arms with angled surfaces and positioned in an extended configuration according to various embodiments described herein.

FIG. 5 shows an embodiment of the fastener insert 102 in which the arms 116 include angled surfaces 502 on the outer portions of the arms. These angled surfaces 502 are shaped and positioned such that contact with the converging walls of an installation tube while the fastener insert 102 is being pressed downward will re-direct the resulting force in a direction that rotates the arms 116 around a central axis to fold the arms 116 inward to the retracted configuration 120. These angled surfaces 502 allow the fastener insert 102 to transition to the retracted configuration 120 without rotation within the installation tube. To better illustrate the installation tube and transition from the extended configuration 122 to the retracted configuration 120 and back to the extended configuration 122 during installation, FIGS. 6 and 7A-7D will show aspects of a fastener insert 102 being installed within a composite panel 104.

Figure 6:
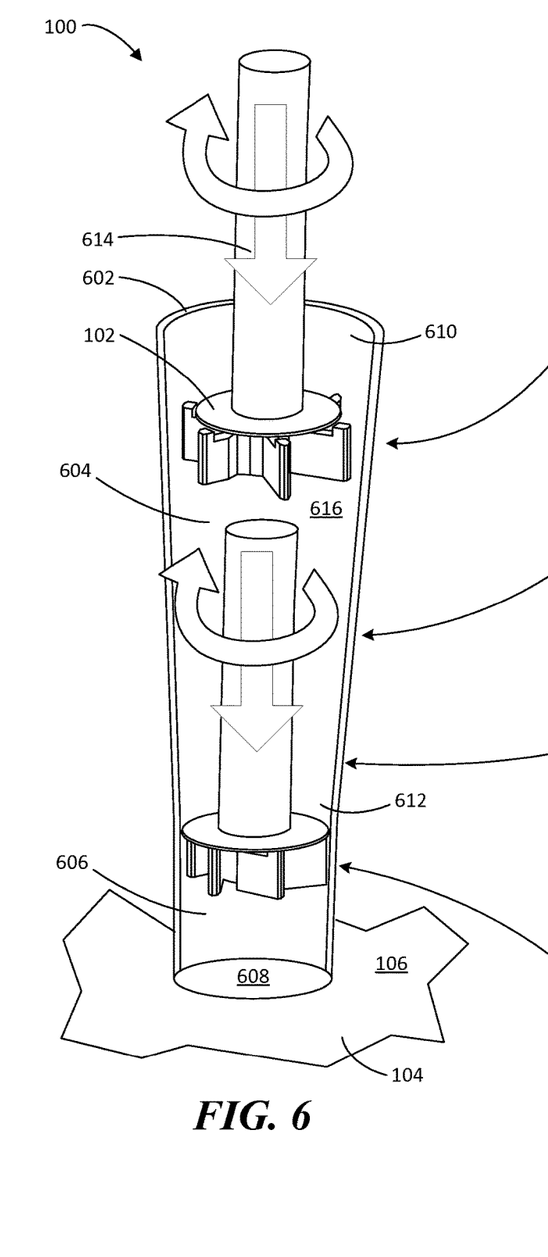
FIG. 6 is a side cutaway view of a fastener insert being installed using an installation tool according to various embodiments described herein.

Looking at FIG. 6, a fastener insert system 600 for a composite panel 104 is shown. The fastener insert system 600 includes a fastener insert 102 and an installation tube 602. The installation tube 602 has an upper portion 604 and a lower portion 606. The lower portion 606 has a diameter that corresponds to the diameter of the aperture 608 in the composite panel 104. The lower portion 606 of the installation tube 602 engages the aperture 608 to guide the fastener insert 102 in place through the aperture 608 and into the composite panel 104. This engagement may include simple abutment of the installation tube 602 against the top sheet 106 of the composite panel 104 such that the lower portion 606 aligns with the aperture 608. Alternatively, the diameter of the lower portion 606 may be sized such that the lower portion 606 snugly fits within the aperture 608.

The upper portion 604 of the installation tube 602 has a converging diameter that at a first end 610 has a diameter greater than the outermost dimensions of the fastener insert 102 when the arms 116 are positioned in the extended configuration 122, and at a second end 612 has a diameter equal to the diameter of the lower portion 606 for engagement with the aperture 608. During installation, an installation tool 614 engages a fastener insert 102 via the tool engagement mechanism 204 and drives the fastener insert 102 downward through the installation tube 602 toward the aperture 608.

According to one embodiment, while driving the fastener insert 102 downward, the installation tool 614 rotates the fastener insert 102 clockwise. When the fastener insert 102 contacts the inside surface 616 of the upper portion 604, the rotation of the fastener insert 102, the downward movement of the fastener insert 102, and the converging diameter of the upper portion 604, imposes a force against an outer portion of the arms 116 that folds them inward toward the central hub 206 to transition the fastener insert 102 from the extended configuration 122 to the retracted configuration 120. After the arms 116 clear the top sheet 106, there is no longer any constraint on the arms 116 and they are free to "pop" back to the extended configuration 122.

According to an alternative embodiment based on the fastener insert 102 of FIG. 5 having angled surfaces 502, no rotation is used during installation. Rather, the installation tool 614 presses the fastener insert 102 downward through the converging diameter of the upper portion 604 of the installation tube 602. As the angled surfaces 502 of the arms 116 of the fastener insert 102 contact the inside surface 616 of the upper portion 604 of the installation tube 602, the force from the contact is re-directed by the angled surfaces 502 in a direction that folds the arms 116 inward toward the center hub 206 to transition the fastener insert 102 to the retracted configuration 120.

Figure 7A:
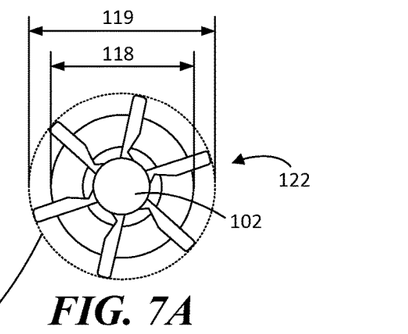
FIGS. 7A-7D are bottom views of a fastener insert with arms transitioning from an extended configuration to a retracted configuration according to various embodiments described herein.
Figure 7B:
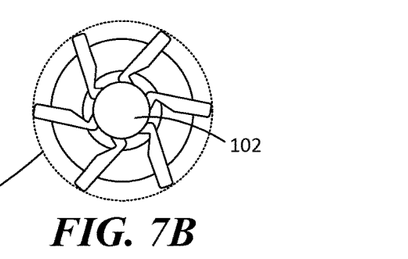
Figure 7C:
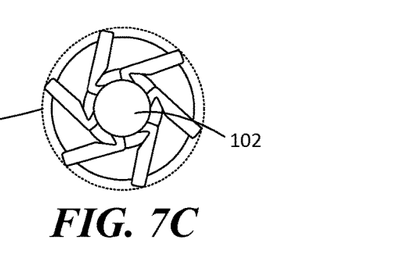
Figure 7D:
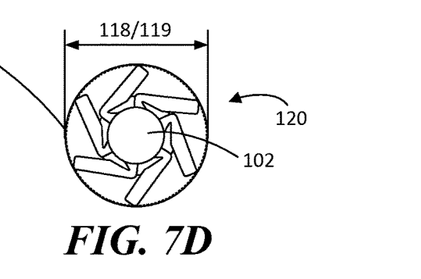

FIGS. 7A-7D are bottom views of the fastener insert 102 as it transitions from the extended configuration 122 shown in FIG. 7A to the retracted configuration 120 shown in FIG. 7D. Each FIG. 7A-7D has an arrow that points to an example location within the installation tube 602 at which the depicted fastener insert 102 might be located with the illustrated positioning of the arms 116. As shown, as the fastener insert 102 moves through the upper portion 604 to the lower portion 606 of the installation tube, the outer arms dimension 119 associated with the arms 116 decreases from the extended configuration 122 shown in FIG. 7A in which the outer arms dimension 119 exceeds the top face outer dimension 118, to the retracted configuration 120 shown in FIG. 7D in which the outer arms dimension 119 is approximately equal to the top face outer dimension 118.

Figure 8:
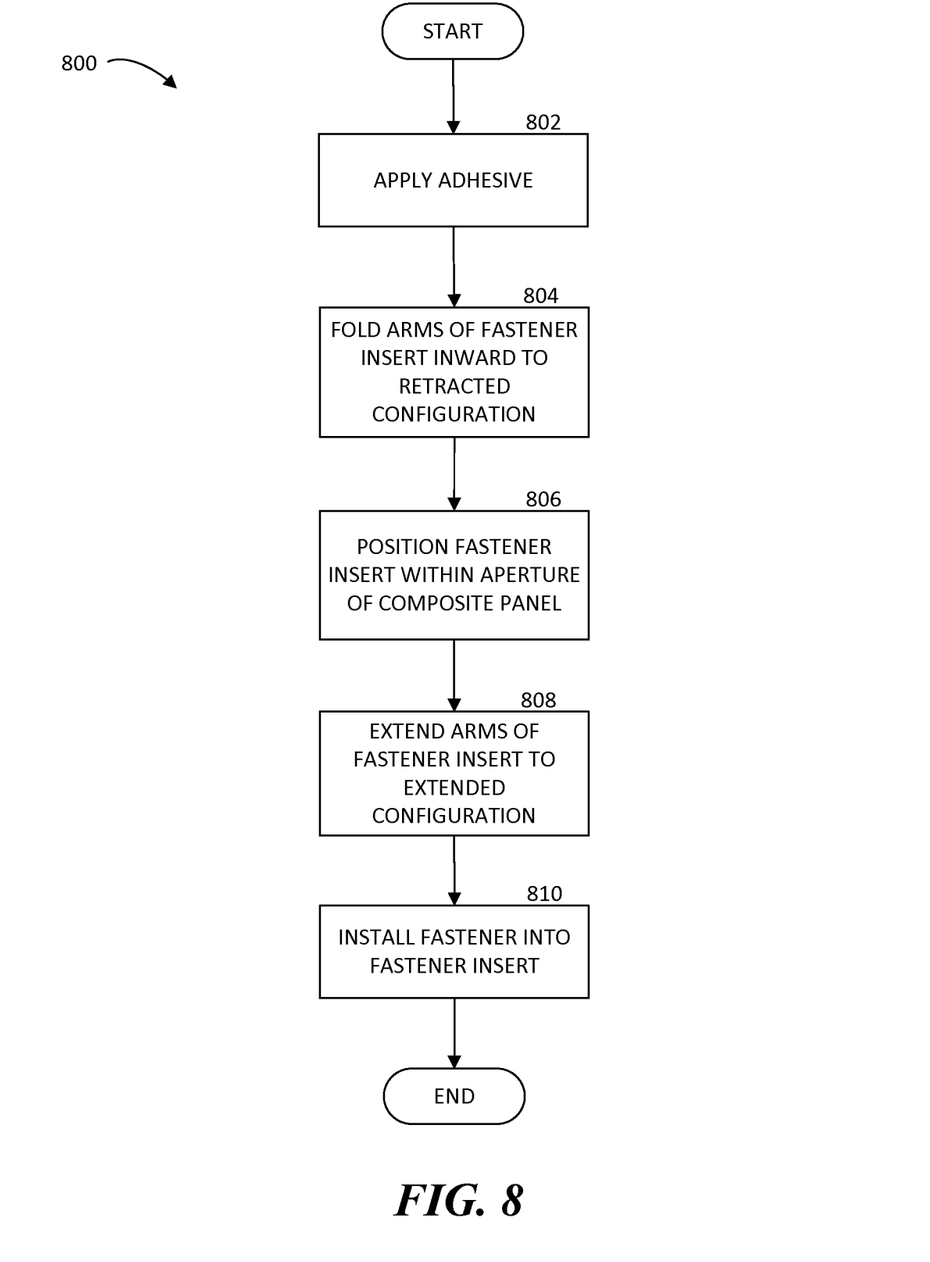
FIG. 8 is a flow diagram showing a method for installing a fastener within a composite panel according to various embodiments presented herein.

Turning to FIG. 8, a method for installing a fastener within a composite panel 104 according to various embodiments presented herein will be described. It should be appreciated that more or fewer operations may be performed than shown in the figures and described herein. These operations may also be performed in parallel, or in a different order than those described herein. FIG. 8 shows a routine 800 for installing a fastener within a composite panel 104. The routine 800 begins at operation 802, where adhesive is applied within the aperture 608 and/or on the fastener insert 102. At operation 804, the arms 116 of the fastener insert 102 are folded inward toward the central hub 206 from the extended configuration 122 to the retracted configuration 120. As discussed above, according to one embodiment, this transition process is facilitated with an installation tube 602 having an upper portion 604 with a converging diameter and a lower portion 606 with a diameter corresponding to a diameter of the aperture 608 in the composite panel 104.

From operation 804, the routine 800 continues to operation 806, where the fastener insert 102 is positioned within the aperture 608 of the composite panel 104. When the arms 116 of the fastener insert 102 clear the top sheet 106 of the composite panel 104, the retraction mechanism 210 extends the arms 116 of the fastener insert 102 back to the extended configuration 122 at operation 808. After the fastener insert 102 is installed within the composite panel 104, the fastener may be installed into the fastener insert 102 via the receiving mechanism 202, and the routine 800 ends. It should be appreciated that the routine 800 may be performed via automation. For example, robotic technology maybe utilized to create the aperture 608 in the composite panel 104, apply the adhesive, and install the fastener insert 102 into the aperture 608. To install multiple fastener inserts 102 within multiple apertures 608, a cartridge (not shown) loaded with fastener inserts 102 may be utilized by a robotic system. The fastener inserts 102 may be extracted from the cartridge one at a time and pressed and/or rotated through the installation tube 602 into the composite panel 104 before repeating the process for subsequent installations.

Based on the foregoing, it should be appreciated that technologies for providing a fastener insert 102 and corresponding method for installing a fastener into a composite panel 104 with a fastener insert 102 are provided herein. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A fastener insert for a composite panel, comprising:
   a body comprising a top face and a central hub extending rearward from a central portion of the top face, the top face having an outer dimension between opposing edges and the central hub comprising a receiving mechanism configured to receive a fastener through the top face of the body; and
   a plurality of arms extending from the central hub on a rear side of the body, the plurality of arms being configured to move, in response to an external force, to a retracted configuration, in which the plurality of arms are folded inward toward the central hub such that the plurality of arms do not extend beyond the outer dimension of the top face, and to move, when the external force is removed, to an extended configuration, in which the plurality of arms are extended outward from the central hub beyond the outer dimension of the top face, wherein each arm is biased toward the extended configuration, wherein each of the plurality of arms comprises a retraction mechanism configured to allow the arm to fold inward to the retracted configuration, wherein the retraction mechanism comprises a notch positioned at a pivot point on one side of the arm such that, when the external force is applied to an outer portion of the arm, the arm folds toward the central hub around the notch at the pivot point, and wherein a material of the arm biases the arm to the extended configuration, such that the arm returns to the extended configuration upon removal of the external force.

2. The fastener insert of claim 1, wherein the top face is circular, wherein the outer dimension of the top face is a diameter, and wherein the central hub is cylindrical.

3. The fastener insert of claim 1, wherein the receiving mechanism comprises a threaded recess configured to receive the fastener.

4. The fastener insert of claim 1, wherein the plurality of arms comprises at least three arms.

5. The fastener insert of claim 1, wherein the top face comprises a thickness approximately equivalent to a thickness of a top sheet of the composite panel, and wherein the central hub extends a distance from the top face approximately equivalent to a thickness of a core of the composite panel such that a bottom surface of the central hub is proximate to a bottom sheet of the composite panel.

6. The fastener insert of claim 5, wherein a top sheet contact surface of each of the plurality of arms is proximate to a bottom surface of the top face of the body while in the retracted configuration and proximate to a bottom surface of the top sheet of the composite panel while in the extended configuration and while installed within the composite panel.

7. The fastener insert of claim 1, wherein the plurality of arms is integrally formed with the body.

8. A method for a fastener within a composite panel, the method comprising:
applying an external force to a plurality of arms of a fastener insert in an inward direction around an axis extending from front to rear through a central hub of the fastener insert to move the arms from an extended configuration, toward which the arms are biased, to a retracted configuration, while installing the fastener insert into an aperture in the composite panel, wherein applying the external force to the plurality of arms of the fastener insert in the inward direction around the axis comprises rotating each arm around a retraction mechanism of the arm configured to allow the arm to fold inward to the retracted configuration, and wherein rotating each arm around the retraction mechanism of the arm comprises rotating the fastener insert while advancing the fastener insert within an installation tool such that the plurality of arms contact an upper portion of the installation tool having a converging diameter and rotate inward in response to rotation and the converging diameter of the upper portion;
positioning the fastener insert within the aperture until a top face of the fastener insert is substantially flush with a top sheet of the composite panel;
releasing the external force to extend the plurality of arms of the fastener insert from the retracted configuration, in which the plurality of arms do not extend beyond an outer dimension of the top face, to the extended configuration, in which the plurality of arms are extended outward from the central hub beyond the outer dimension of the top face; and
installing the fastener through the top face of the fastener insert and into the central hub of the fastener insert.

9. The method of claim 8, wherein rotating each arm around a retraction mechanism of the arm comprises pressing the fastener insert within an installation tool such that the plurality of arms contact an upper portion of the installation tool having a converging diameter and rotate inward in response to pressure against the upper portion having the converging diameter.

10. The method of claim 9, wherein each arm comprises an angled surface proximate to an end of the arm configured for contacting the upper portion of the installation tool and in response, rotating the arm around the refraction mechanism to the retracted configuration, and wherein rotating inward in response to pressure against the upper portion having the converging diameter comprises rotating inward in response to pressure from the upper portion applied to the angled surface to rotate the arm around the refraction mechanism.

11. The method of claim 8, wherein the retraction mechanism comprises a notch positioned at a pivot point on one side of the arm such that, when the external force is applied to an outer portion of the arm, the arm rotates toward the central hub around the notch at the pivot point, and wherein a material of the arm biases the arm such that the arm returns to the extended configuration upon removal of the external force.

12. A fastener insert system for a composite panel, the system comprising:
a fastener insert, comprising
a body comprising a top face and a central hub extending rearward from a central portion of the top face, the top face having an outer dimension between opposing edges and the central hub comprising a receiving mechanism configured to receive a fastener through the top face of the body, and
a plurality of arms extending from the central hub on a rear side of the body and comprising a retracted configuration in which the plurality of arms are folded inward toward the central hub such that the plurality of arms do not extend beyond the outer dimension of the top face, and an extended configuration in which the plurality of arms are extended outward from the central hub beyond the outer dimension of the top face; and
an installation tool comprising an upper portion having a converging diameter and a lower portion having a diameter complimentary to a diameter of the top face of the fastener insert such that the lower portion guides the fastener insert into a fastener insert aperture of the composite panel while maintaining the plurality of arms in the retracted configuration.

13. The system of claim 12, wherein each of the plurality of arms of the fastener insert comprises a refraction mechanism configured to allow the arm to fold inward to the retracted configuration.

14. The system of claim 12, further comprising: an insert cartridge configured to maintain a plurality of fastener inserts in position for individual installation via the installation tool; and
a fastener insert insertion tool configured to press or rotate each fastener insert from the insert cartridge through the installation tool and into the fastener insert aperture of the composite panel.

15. A method for a fastener within a composite panel, the method comprising:
folding a plurality of arms of a fastener insert inward around an axis extending from front to rear through a central hub of the fastener insert while installing the fastener insert into an aperture in the composite panel;
rotating each arm of a plurality of arms of a fastener insert inward around a retraction mechanism of the arm configured to allow the arm to fold inward to a retracted configuration while installing the fastener insert into an aperture in the composite panel;
positioning the fastener insert within the aperture until a top face of the fastener insert is substantially flush with a top sheet of the composite panel;
extending the plurality of arms of the fastener insert from the retracted configuration, in which the plurality of arms do not extend beyond an outer dimension of the top face, to an extended configuration, in which the plurality of arms are extended outward from the central hub beyond the outer dimension of the top face; and
installing the fastener through the top face of the fastener insert and into the central hub of the fastener insert;
wherein rotating each arm of a plurality of arms of a fastener insert inward around a retraction mechanism of the arm comprises pressing the fastener insert within an installation tool such that the plurality of arms contact an upper portion of the installation tool having a converging diameter and rotate inward in response to pressure against the upper portion having the converging diameter.

* * * * *